Figure 1:
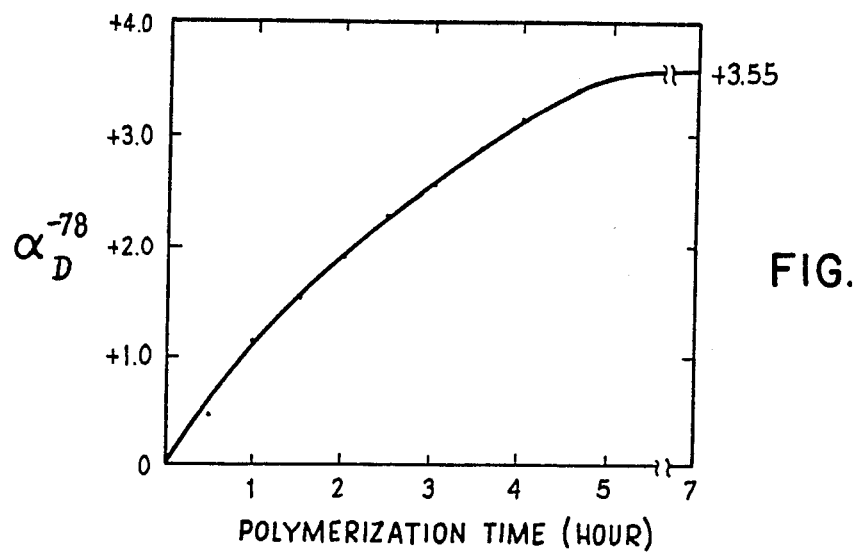

United States Patent [19]

Yuki et al.

[11] Patent Number: 4,554,334

[45] Date of Patent: Nov. 19, 1985

[54] PROCESS FOR PREPARING OPTICALLY ACTIVE POLYMER

[75] Inventors: Heimei Yuki, Sakai; Yoshio Okamoto, Amagasaki, both of Japan

[73] Assignee: Daicel Chemical Industries, Ltd., Sakai, Japan

[21] Appl. No.: 639,967

[22] Filed: Aug. 10, 1984

Related U.S. Application Data

[62] Division of Ser. No. 471,584, Mar. 3, 1983, Pat. No. 4,478,953.

[30] Foreign Application Priority Data

Mar. 9, 1982 [JP] Japan .................................. 57-36909

[51] Int. Cl.$^4$ ........................... C08F 4/46; C08F 4/50; C08F 4/52
[52] U.S. Cl. .................................... 526/177; 526/173; 526/180; 526/181; 526/183; 526/185; 526/189; 526/328; 526/265; 526/303.1
[58] Field of Search ............... 526/173, 177, 180, 181, 526/183, 185, 189

[56] References Cited

U.S. PATENT DOCUMENTS 4,107,418 8/1978 Yatsu .................................... 526/184
4,230,841 10/1980 Prudence ............................. 526/179

FOREIGN PATENT DOCUMENTS 930524 7/1963 United Kingdom .
943231 12/1963 United Kingdom .

*Primary Examiner*—Christopher A. Henderson
*Attorney, Agent, or Firm*—Flynn, Thiel, Boutell & Tanis

[57] ABSTRACT

An optically active polymer is obtained by polymerizing a vinyl monomer in the presence of a catalyst which comprises an asymmetric ligand compound of the formula (I) or (II):

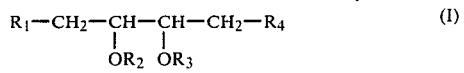

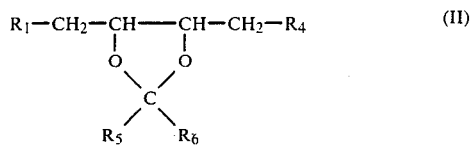

in which $R_1$ and $R_4$ each are $-O-R_7$, $-S-R_7$,

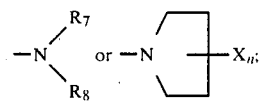

$R_2$, $R_3$, $R_5$, $R_6$, $R_7$ and $R_8$ each are an alkyl group having 1 to 10 carbon atoms; X is hydrogen, an alkyl group having 1 to 10 carbon atoms or a halogen; and n is a number of 1 to 4; and an anionic initiator to form a complex with said ligand compound.

10 Claims, 3 Drawing Figures

PROCESS FOR PREPARING OPTICALLY ACTIVE POLYMER

This is a division of application Ser. No. 471,584, filed Mar. 3, 1983 now U.S. Pat. No. 4,478,953.

The present invention relates to an optically active polymerization catalyst comprising a specific asymmetric ligand compound and an anionic initiator and a process for synthesizing an optically active polymer using this polymerization catalyst.

As polymerization catalysts for obtaining optically active polymers, there have been known (−)-sparteine/butyllithium complex and lithium (R)-N-(1-phenylethyl)anilide.

However, these catalysts have the following defects. That is, when the (−)-sparteine/butyllithium complex is used, the polymerization rate is slow and polymers having a high polymerization degree and insoluble in ordinary organic solvents are formed in many cases. When lithium (R)-N-(1-phenylethyl)anilide is used, the resulting polymers have only a low optical rotation.

After intensive investigations of these problems, the inventors have found a new, optically active polymerization catalyst having quite excellent performances. The present invention has been attained on the basis of this finding.

The present invention provides an optically active polymerization catalyst comprising an asymmetric ligand compound of the following general formula (I) or (II):

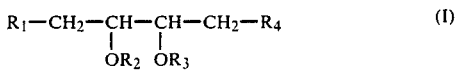

(I)

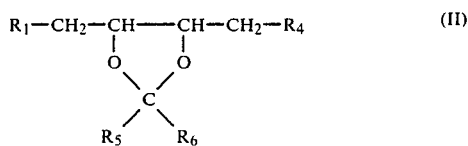

(II)

wherein $R_1$ and $R_4$ represent each $-O-R_7$, $-S-R_7$,

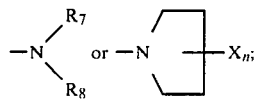

$R_2$, $R_3$, $R_5$, $R_6$, $R_7$ and $R_8$ represent each an alkyl group having 1 to 10 carbon atoms; X represents hydrogen, an alkyl group having 1 to 10 carbon atoms or halogen and n represents a number of 1 to 4, and an anionic initiator, and a process for synthesizing an optically active polymer characterized by polymerizing a polymerizable monomer in the presence of this polymerization catalyst.

A characteristic feature of the present invention is that by using the above-mentioned catalyst, the degree of polymerization of the resulting polymer can be controlled easily and an optically active polymer having a high optical rotation can be obtained.

The asymmetric ligand compound constituting the optically active polymerization catalyst of the present invention is shown by the above general formula (I) or (II) wherein $R_2$, $R_3$, $R_5$, $R_6$, $R_7$ and $R_8$ are preferably each a methyl group and X is preferably hydrogen.

As examples of the asymmetric ligand compounds, the following compounds may be mentioned, wherein symbol * represents an asymmetric carbon atom.

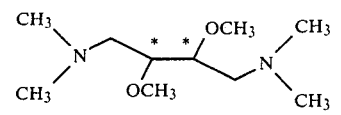

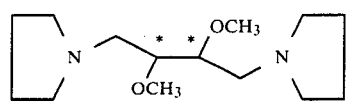

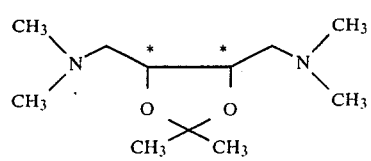

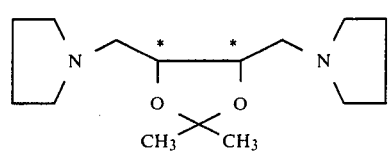

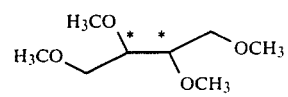

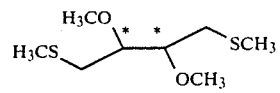

The anionic initiator constituting the optically active polymerization catalyst of the present invention may be any compound usable as an initiator for the anionic polymerization and capable of forming a complex with the asymmetric ligand compound.

As concrete examples of the anionic initiators, there may be mentioned those comprising a counter ion such as an alkali metal, alkaline earth metal, aluminum or a similar metal and an anion such as carbon, nitrogen, oxygen or sulfur anion.

Anionic initiators containing a carbanion are preferred. They include, for example, the following compounds:

RMgX, $R_2$Mg, RCaX, Al($C_2H_5$)$_3$, LiR, LiAlH$_4$, NaR, KR wherein R represents an alkyl group having 1 to 50 carbon atoms, preferably 1 to 15 carbon atoms, and X represents halogen.

Further, anion initiators containing a nitrogen anion, i.e., those derived from secondary amines are also preferred. As secondary amines usable as the anion of a lithium amide, the following compounds may be mentioned:

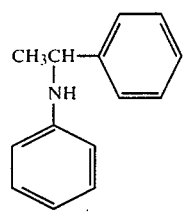

N—alpha-phenylethylanaline

-continued

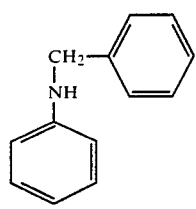
N—benzylaniline

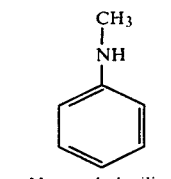
N—methylaniline

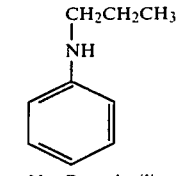
N—Propylaniline

Diphenylamine

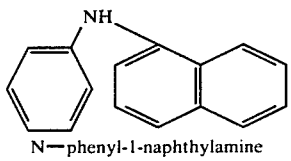
N—phenyl-1-naphthylamine

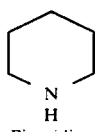
Piperidine

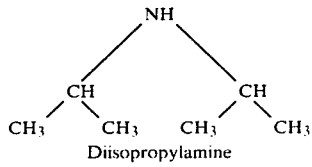
Diisopropylamine

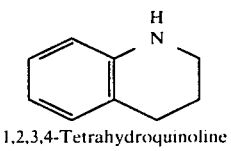
1,2,3,4-Tetrahydroquinoline

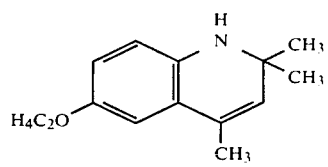
6-Ethoxy-2,2,4-trimethyl-1,2-dihydroquinoline

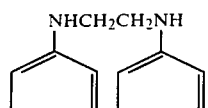
N,N'—Diphenylethylenediamine

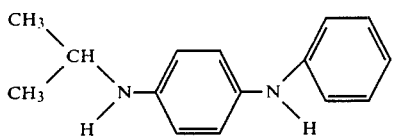
N—Phenyl-N'—isopropyl-p-phenylenediamine

As the polymerizable monomers usable for the synthesis of the optically active polymers according to the present invention, there may be used any monomer containing a vinyl group.

They include, for example α-substituted acrylate esters such as methacrylate esters, acrylate esters, N-substituted maleimides, N,N-disubstituted or N-monosubstituted acrylamides and methacrylamides, styrene and its derivatives, conjugated dienes, methacrylonitrile, acrylonitrile and vinylpyridine.

A preferred method of preparing the catalyst of the present invention comprises mixing an anionic initiator compound with a dried asymmetric ligand compound in an amount equimolar to or a little larger than that of the anionic initiator compound in a solvent such as toluene to form a complex. The complex thus formed is used as the polymerization catalyst. In the polymerization of the polymerizable monomer in the presence of the obtained polymerization catalyst, the polymerizable monomer may be used either as it is or in the form of a solution in a solvent. The solvent used in the polymerization should not be one which inhibits the anion polymerization.

BRIEF DESCRIPTION OF THE HERETO ATTACHED DRAWINGS

Figure 2:
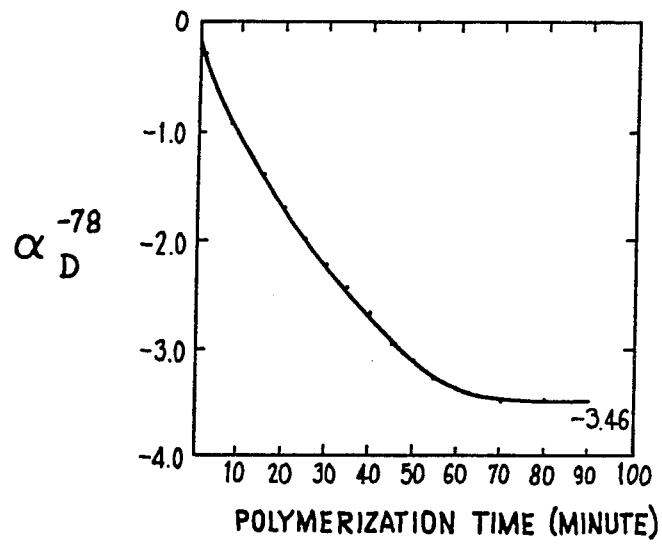
Figure 3:
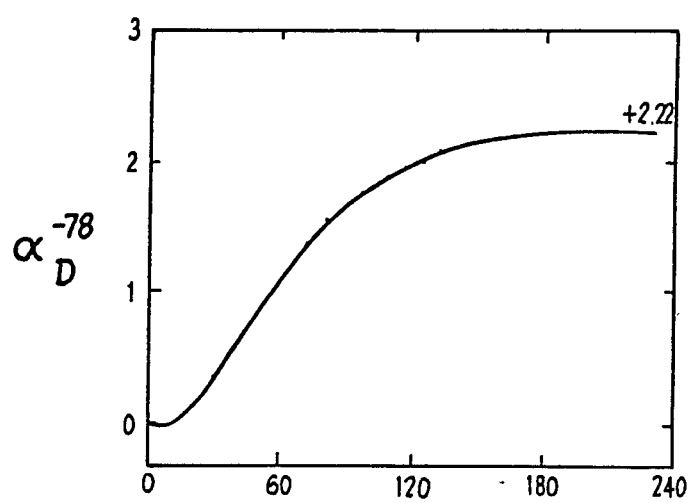

FIGS. 1 to 3 show changes of optical rotation with time in the course of polymerization conducted in the examples of the invention.

The following examples illustrate preferred embodiments of the present invention, which examples by no means limit the invention.

EXAMPLE 1

The asymmetric polymerization of triphenylmethyl methacrylate (hereinafter referred to as TrMA) was carried out in the presence of (S,S)-(+)-2,3-dimethoxy-1,4-bis(dimethylamino)butane (I)/BuLi complex in toluene at −78° C. as follows.

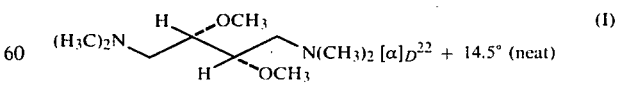

The polymerization reaction was carried out in nitrogen stream in a sufficiently dried 1-cm quartz cell. First, 0.15 g (0.46 mmol) of TrMA was dissolved in 3 ml of toluene and the mixture was cooled to −78° C. 0.023 mmol of asymmetric compound (I)/BuLi complex previously prepared at room temperature by mixing compound (I) (a product of Aldrich Co.) with n-BuLi (n-butyllithium) in toluene was added to the solution of the monomer in toluene to initiate the polymerization.

Changes in optical rotation in the course of the polymerization were followed at −78° C. using a polarimeter (YANAGIMOTO MODEL OR-10). A high positive optical rotation was observed. Unlike a case wherein (−)-sparteine/BuLi was used, negative optical rotation was not observed in the initial stage of the polymerization, the optical rotation was increased rapidly and the polymerization was completed in a short time (7 h).

The changes in optical rotation with time observed in the course of the polymerization is shown in FIG. 1.

EXAMPLE 2

The asymmetric polymerization of triphenylmethyl methacrylate was carried out in the presence of (R,R)-(−)-2,3-dimethoxy-1,4-bis(dimethylamino)butane (II)/BuLi complex in toluene at −78° C. as follows.

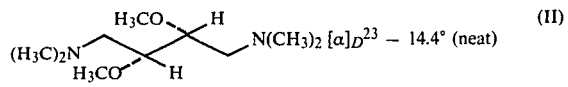

The polymerization reaction was carried out in nitrogen stream in a sufficiently dried 1-cm quartz cell. First, 0.15 g (0.46 mmol) of TrMA was dissolved in 3 ml of toluene and the solution was cooled to −78° C. Then, (II)/BuLi complex was prepared at room temperature and 0.023 mmol of this complex was added to the solution of the monomer in toluene to initiate the polymerization. Changes in optical rotation in the course of the polymerization was examined using the polarimeter in the same manner as in Example 1. A high negative optical rotation was observed. The changes in optical rotation with time in the polymerization is shown in FIG. 2. An optically active polymer having an optical rotation with an opposite sign to that of the polymer obtained in Example 1 was obtained in a short time.

EXAMPLE 3

The asymmetric polymerization of triphenylmethyl methacrylate was carried out in the presence of (S,S)-(+)-3,4-isopropylidenedioxy-N,N,N',N'-bis(tetramethylene)-1,4-butanediamine (III)/BuLi complex in toluene at −78° C. as follows.

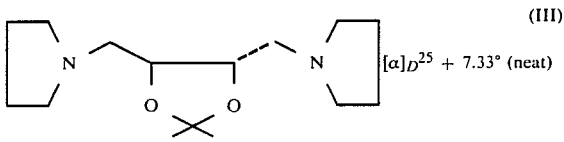

The polymerization reaction was carried out in nitrogen stream in a sufficiently dried 1-cm quartz cell. First, 0.15 g (0.46 mmol) of TrMA was dissolved in 3 ml of toluene and the solution was cooled to −78° C. Then, (III)/BuLi complex was prepared at room temperature and 0.023 mmol of this complex was added to the solution of the monomer in toluene to initiate the polymerization. After 24 h, the polymerization was terminated with a small quantity of methanol. The resulting polymer was precipitated in 100 ml of methanol and then centrifuged. The polymer was dried in a desiccator and weighed. 13% of a tetrahydrofuran (THF)-solution polymer was obtained. The polymer had $[\alpha]_D^{25}$ of −55° (THF). The optical rotation of the polymer was determined by means of DIP-181 (a product of Nihon Bunko Co.).

EXAMPLE 4

The asymmetric polymerization of triphenylmethyl methacrylate was carried out in the presence of (R,R)-(+)-2,3-dimethoxy-N,N,N',N'-bis(tetramethylene)-1,4-butanediamine (IV)/(BuLi+racemic α-phenylethylaniline) complex in toluene at −78° C. as follows.

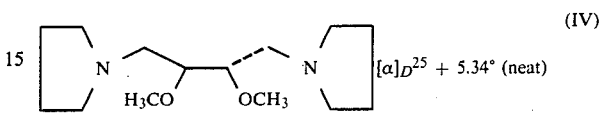

The polymerization reaction was carried out in nitrogen stream in a sufficiently dried 1-cm quartz cell. First, 0.15 g (0.46 mmol) of TrMA was dissolved in 3 ml of toluene and the solution was cooled to −78° C. Then, (IV)/(BuLi+racemic α-phenylethylaniline) complex was prepared at room temperature and 0.023 mmol of this complex was added to the solution of the monomer in toluene to initiate the polymerization. Changes in optical rotation in the course of the polymerization was examined using the polarimeter in the same manner as in Example 1. A high positive optical rotation was observed. The changes in optical rotation with time in the polymerization is shown in FIG. 3.

EXAMPLE 5

The asymmetric polymerization of triphenylmethyl methacrylate was carried out in the presence of (R,R)-(−)-2,3-dimethoxy-1,4-bis(dimethylamino)butane (II)/lithium amide complex in toluene at −78° C. as follows.

The polymerization reaction was carried out in nitrogen stream in a sufficiently dried 60 ml sealed glass ampul. First, 1.00 g (3.05 mmol) of TrMA was dissolved in 20 ml of toluene and the solution was cooled to −78° C. Then, BuLi was reacted with an equivalent amount of an amine shown in Table 1 in toluene at room temperature to form a lithium amide. The asymmetric ligand compound (II) in an amount of 1.2 equivalents was added to the lithium amide to prepare a complex. 0.15 mmol of the complex was added to the solution of the monomer in toluene to initiate the polymerization.

The polymerization was terminated with a small amount of methanol. The resulting polymer was precipitated in 200 ml of methanol, centrifuged, dried and weighed. The polymer was pulverized in a mortar. THF was added to the powder and the mixture was stirred for 5 to 15 h to separate the same into a THF-soluble fraction and a THF-insoluble fraction. Optical rotation of the THF-soluble fraction was determined and this fraction was dissolved in THF and then precipitated in a 10-fold amount of benzene/hexane (1:1). The precipitate was centrifuged and separated into a benzene/hexane-soluble fraction and a benzene/hexane-insoluble fraction. Optical rotations of the both fractions were determined. The results of the polymerization are summarized in Table 1.

The molecular weight and polymerization degree were determined according to GPC (a calibration curve based on PST) and optical rotation was determined by using DIP-181 (a product of Nihon Bunko Co.).

TABLE 1[a]

| No. | Amine used for lithium amide preparation | Yield (%) | THF-soluble fraction Yield (%) | THF-soluble fraction $[\alpha]_D^{25[b]}$ (deg) | B/H (1:1)-insoluble[c] fraction Yield | B/H (1:1)-insoluble[c] fraction $[\alpha]_D^{25[b]}$ | THF-soluble fraction B/H (1:1)-soluble[c] fraction Yield | THF-soluble fraction B/H (1:1)-soluble[c] fraction $[\alpha]_D^{25[b]}$ | THF-insoluble fraction Yield (%) | B/H (1:1)-insoluble fraction[f] MW | B/H (1:1)-insoluble fraction[f] DP |
|---|---|---|---|---|---|---|---|---|---|---|---|
| 1 | (−)-N—(alpha-phenylethyl)aniline (e.e. 53%) | 100 | 100 | −292 | 85 | −353 | 15 | +2 | 0 | 14,300 | 43 |
| 2 | racemic N—(alpha-phenylethyl)aniline | 100 | 100 | −296 | 83 | −342 | 17 | −30 | 0 | 11,300 | 35 |
| 3[d] | | 100 | 56 | −335 | 48 | −358 | 8 | +2 | 44 | | |
| 4 | N—benzylaniline | 100 | 100 | −271 | 83 | −322 | 17 | −58 | 0 | 7,900 | 24 |
| 5 | " | 100 | 100 | −295 | 86 | −319 | 14 | −42 | | | |
| 6[d] | " | 100 | 100 | −302 | 91 | −325 | 9 | −34 | 0 | | |
| 7[d] | " | 100 | 36 | −263 | 29 | −276 | 7 | −55 | 64 | | |
| 8[e] | " | 74 | 65 | −281 | 55 | −304 | 10 | −64 | 9 | | |
| 9 | N—methylaniline | 100 | 16 | −165 | 8 | −305 | 8 | −43 | 84 | | |
| 10 | N—propylaniline | 100 | 100 | −309 | 88 | −350 | 12 | −36 | 0 | | |
| 11 | diphenylamine | 100 | 90 | −296 | 79 | −313 | 11 | −33 | 10 | | |
| 12 | N—phenyl-N—1-naphthylamine | 100 | 5 | −33 | 0 | | 5 | −28 | 95 | | |
| 13 | piperidine | 27 | 10 | −75 | 5 | −146 | 5 | −18 | 17 | | |
| 14 | diisopropylamine | 100 | 9 | −144 | 4 | −326 | 5 | −48 | 91 | | |
| 15 | 1,2,3,4-tetrahydroquinoline | 21 | 21 | −231 | | | | | | | |
| 16 | 6-ethoxy-2,2,4-trimethyl-1,2-dihydroquinoline | 100 | 100 | −305 | 89 | −328 | 11 | −18 | 0 | | |
| 17 | N,N′—diphenylethylenediamine | 100 | 100 | −325 | 88 | −354 | 12 | −21 | 0 | 14,800 | 45 |
| 18 | N—phenyl-N′—isopropyl-p-phenylenediamine | 100 | 100 | −285 | 84 | −324 | 16 | −60 | 0 | 11,000 | 34 |

(Notes)
[a]Monomer: 1.0 g, monomer (g)/toluene (ml): 1/20, catalyst conc. (C/M): 1/20, polymerization time: 2h.
[b]Determined in THF.
[c]Benzene/hexane (1:1)
[d]Catalyst conc. (C/M): 1/30.
[e]Catalyst conc. (C/M): 1/40.
[f]M.W. and D.P. of B/H (1:1)-insoluble fraction
MW: Molecular weight
DP: Degree of polymerization.

EXAMPLE 6

N-Methyl-N-tritylacrylamide was polymerized in nitrogen stream in a sealed glass tube. 1.0 g (3.05 mmol) of the monomer was dissolved in 20 ml of toluene. The temperature of the solution was controlled to a given polymerization temperature. A catalyst (0.15 mmol) previously prepared at room temperature was added thereto to initiate the polymerization. A small amount of methanol was added to the reaction system to terminate the polymerization. The resulting polymer was precipitated in 200 ml of methanol, filtered and then dried under reduced pressure. The catalyst was prepared by reacting N,N′-diphenylethylenediamine with BuLi in equimolar amounts in toluene at room temperature and then adding 1.2 equivalents of the above-mentioned asymmetric ligand compound (III) to the reaction product. The results of the polymerization are shown in the following table:

| Polymerization temperature (°C.) | Time (h) | Yield (%) | Number-average molecular weight | Specific rotatory power in THF $[\alpha]_{365}^{25}$ |
|---|---|---|---|---|
| −78 | 3 | 93 | | −12.4 |
| −40 | 0.7 | 99 | | +24.1 |
| 0 | 3 | 100 | 5020 | +67.1 |
| +10 | 0.5 | 100 | | +52.1 |

EXAMPLE 7

Diphenyl-4-pyridylmethyl methacrylate was polymerized in the same manner as in Example 6. After carrying out the reaction at −78° C. for 24 h, a methanol-insoluble polymer was obtained in a yield of 72%. The specific rotatory power of the polymer ($[\alpha]_{546}^{25}$) was +14° in chloroform containing 10% of 2,2,2-trifluoroethanol.

The embodiments of the invention of which an exclusive property or privilege is claimed are defined as follows:

1. A process for preparing an optically active polymer, which comprises polymerizing an anionically polymerizable monomer containing a vinyl group, in the presence of an anionic polymerization catalyst comprising a complex of (A) an asymmetric ligand compound of the formula (I) or formula (II):

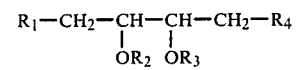

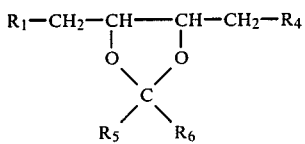

in which $R_1$ and $R_4$ each is $-O-R_7$, $-S-R_7$,

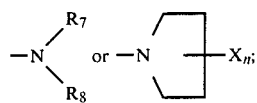

$R_2$, $R_3$, $R_5$, $R_6$, $R_7$ and $R_8$ each is alkyl having 1 to 10 carbon atoms; X is hydrogen, alkyl having 1 to 10 carbon atoms or halogen; and n is a number of 1 to 4; and (B) an anionic polymerization initiator capable of forming a complex with said ligand compound and effective for initiating anionic polymerization of anionically polymerizable monomers containing a vinyl group, said anionic initiator containing a carbanion or a nitrogen anion derived from a secondary amine.

2. A process according to claim 1 in which said anionic initiator is selected from the group consisting of $RMgX$, $(R)_2Mg$, $RCaX$, $Al(C_2H_5)_3$, LiR, LiAlH$_4$, NaR and KR, wherein R is alkyl having 1 to 50 carbon atoms and X is halogen.

3. A process according to claim 1 in which said anionic initiator is selected from the group consisting of LiR, NaR and KR wherein R is alkyl having 1 to 15 carbon atoms.

4. A process according to claim 1 in which said anionic initiator is n-butyllithium.

5. A process according to claim 1 in which said anionic initiator contains a nitrogen anion derived from a secondary amine selected from the group consisting of N-alpha-phenylethylaniline, N-benzylaniline, N-methylaniline, N-propylaniline, diphenylamine, N-phenyl-1-naphthylamine, piperidine, diisopropylamine, 1,2,3,4-tetrahydroquinoline, 6-ethoxy-2,2,4-trimethyl-1,2-dihydroquinoline, N,N'-diphenylethylene diamine, N-phenyl-N'-isopropyl-p-phenylene diamine.

6. A process according to claim 5 in which said anionic initiator is the reaction product of n-butyllithium with said secondary amine.

7. A process according to claim 1 in which each $R_2$, $R_3$, $R_5$, $R_6$, $R_7$ and $R_8$ is methyl and X is hydrogen.

8. A process according to claim 1 in which said catalyst has been prepared by mixing said anionic initiator into a solution of said asymmetric ligand compound, in an anhydrous state, dissolved in an organic solvent.

9. A process as claimed in claim 1, in which said catalyst consists essentially of said complex.

10. A process as claimed in claim 1 in which said monomer is selected from the group consisting of methacrylic esters, acrylic esters, N-substituted maleimides, N,N-disubstituted or N-monosubstituted acrylamides, methacrylamides, styrene, conjugated dienes, methacrylonitrile, acrylonitrile and vinylpyridine.

* * * * *